Feb. 16, 1965  E. M. POWELL ETAL  3,169,374
POWER PLANT SYSTEM
Filed Dec. 27, 1961  2 Sheets-Sheet 1
FIG_1
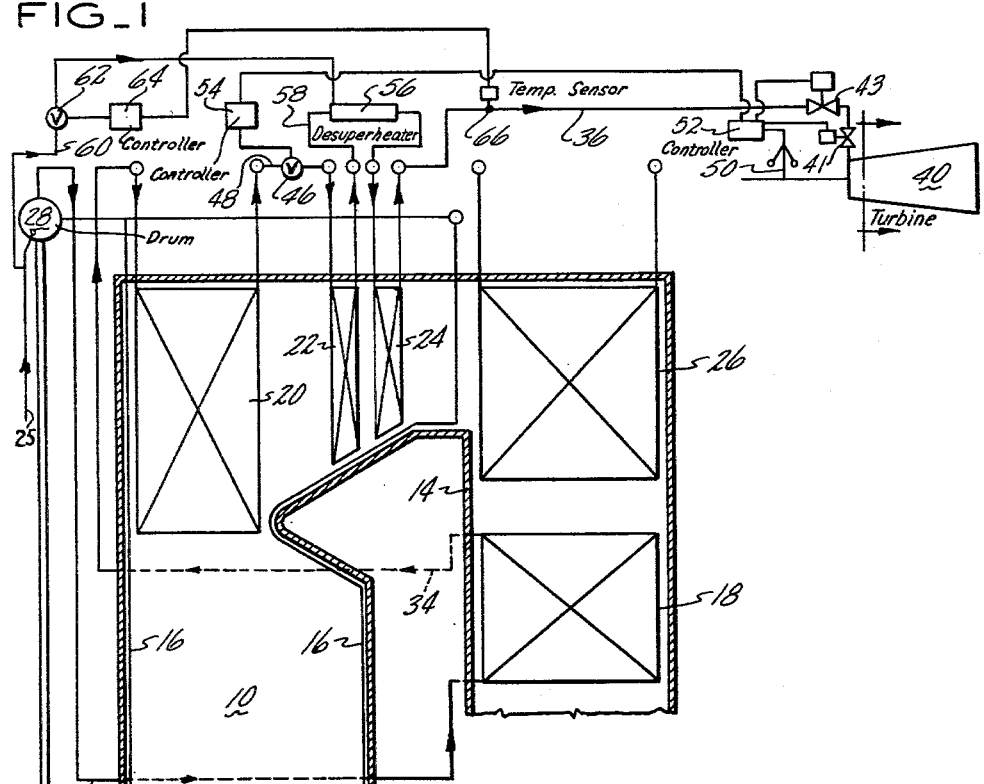
FIG_2
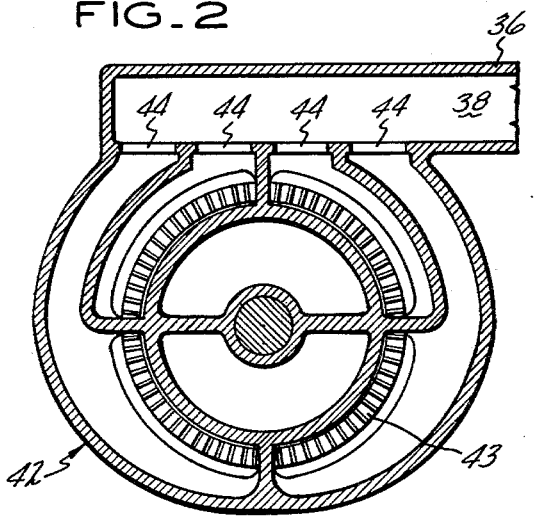
INVENTORS
ELNO M. POWELL
VIRGINIUS Z. CARACRISTI
BY Eldon H. Luther
ATTORNEY

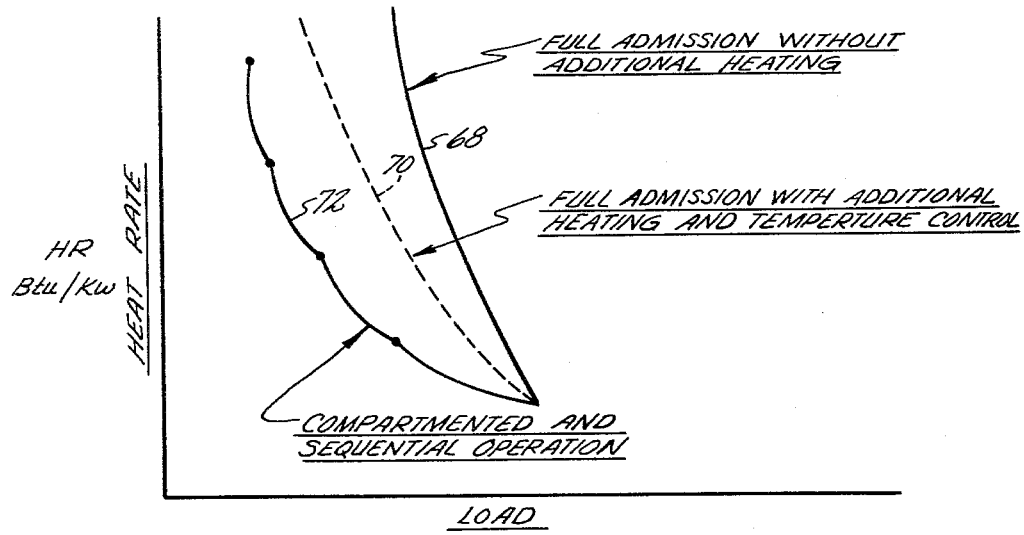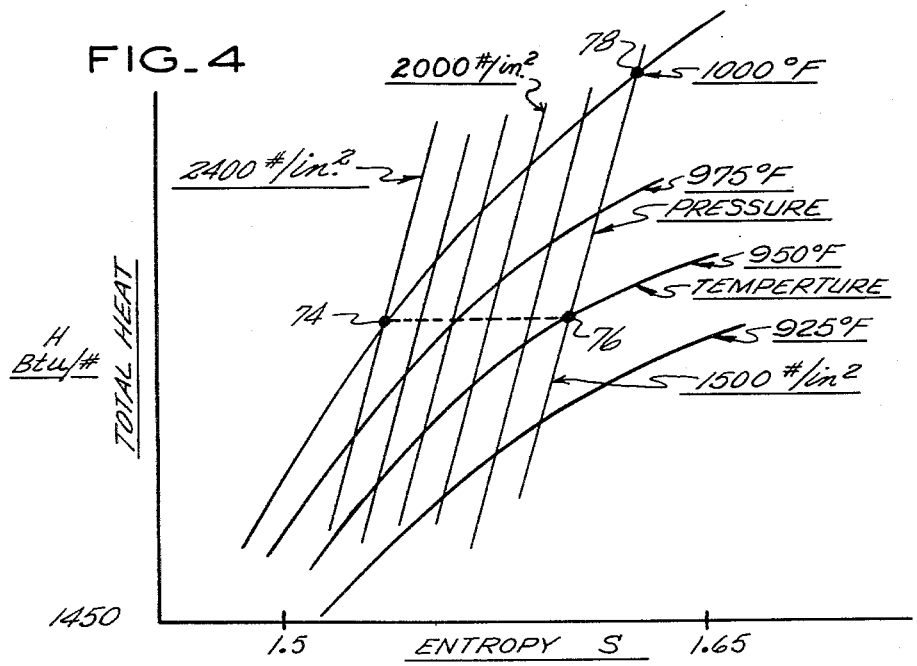

United States Patent Office 3,169,374
Patented Feb. 16, 1965

3,169,374
POWER PLANT SYSTEM
Elno M. Powell, Avon, and Virginius Z. Caracristi, West Hartford, Conn., assignors to Combustion Engineering, Inc., Windsor, Conn., a corporation of Delaware
Filed Dec. 27, 1961, Ser. No. 162,357
19 Claims. (Cl. 60—105)

This invention relates generally to power plant systems and methods of operating the same wherein superheated vapor is produced in a vapor generator with this vapor being supplied to a turbine as the driving medium or motive fluid therefor, with the invention being particularly adapted for use in such a power generation system operating at high capacity and high pressure.

It is conventional in the operation of these power generating systems to control the output of the turbine by means of throttle valves mounted in the vapor chest or valve chest of the turbine with these valves controlling the delivery of superheated vapor to the first high pressure or so-called governing stage of the turbine. The nozzle box of the turbine for this governing stage is segmented or partitioned into compartments with one of the valves in the valve chest controlling the delivery of vapor to each of these compartments. Through this arrangement the delivery of vapor to different segments of the nozzle arc of the first turbine stage may be individually controlled. The purpose of this is to allow for sequential operation of the valves in order to improve the efficiency of the power generation cycle over that which would prevail by throttling the total vapor flow to the turbine. While this arrangement and operation provides for an increased efficiency it introduces complications as the capacity, pressure and temperature of the power generating unit are increased. These complicating factors become such at very high capacities, pressures and temperatures that it is very desirable, notwithstanding the decrease in efficiency, to do away with this sequential valve control and provide for full admission of the superheated vapor to the first or governing stage of the turbine. By the term "full admission," as used in the art, it is meant that the superheated vapor is delivered throughout the entire circumferential or arcuate extent of the first turbine stage. One of the reasons for providing full admission with high capacity, high pressure and temperature units is to avoid excessive loadings on the buckets or blades of the first stage which would occur if sequential throttle valve operation was utilized where at reduced loads only a small arc of the first stage receives the superheated vapor. This non-uniform loading causes vibrations and fatigue failures.

While it is desirable to have full admission with high pressure, high capacity temperature units, if the full vapor flow is throttled at the vapor chest of the turbine the decreases in efficiency will be quite substantial since this throttling of the vapor is accompanied by a decrease in the temperature.

In accordance with the invention there is provided a method and system whereby full admission of the turbine is had with the temperature of the vapor delivered to the governing stage being maintained at a predetermined value throughout the operating range.

It is an object of this invention to provide an improved power generating system and method of operation whereinsuperheated vapor is supplied to a turbine and where the turbine is operated at full admission throughout a substantial load range.

Another object of the invention is to provide such a power generating system and method of operation wherein the vapor temperature delivered to the turbine throughout said substantial load range is maintained at a predetermined value.

Still another object of the invention is to provide such a power generating system and method of operation wherein the total vapor flow to the turbine is throttled with heat being imparted to the vapor downstream of the throttling location.

Other and further objects of the invention will become apparent to those skilled in the art as the description proceeds.

With the aforementioned objects in view, the invention comprises an arrangement, construction and combination of the elements of the inventive organization in such a manner as to attain the results desired as hereinafter more particularly set forth in the following detailed description of an illustrative embodiment, said embodiment being shown by the accompanying drawings wherein:

FIG. 1 is a schematic representation of a power plant system embodying the present invention with the view of the vapor generator in this figure being in the nature of a vertical section;

FIG. 2 is a transverse section, somewhat diagrammatic, of the turbine of FIG. 1 with this view being taken generally along line 2—2 of FIG. 1 and showing the vapor chest and nozzle box of the turbine;

FIG. 3 is a set of curves wherein the heat rate is plotted against the load with this view showing the curve that is produced when sequential turbine throttle valve control is provided; when full admission without temperature control is provided; and wherein full admission in accordance with the present invention is provided where the temperature of the vapor delivered to the turbine is maintained at its predetermined value throughout the load range; and FIG. 4 is a plot of enthalpy against entropy indicating the heat content in the vapor when operating in accordance with the present invention.

Referring now to the drawings, wherein like reference characters are used throughout to designate like elements, the power generating system as illustratively disclosed therein includes a vapor or steam generator having a furnace 10 into which fuel and air are introduced through burners 12 with the fuel being burned in the furnace and the combustion gases pass up therethrough and through the gas pass 14 which extends from the furnace outlet. The furnace has its walls lined with heat exchange tubes 16 and disposed in the stream of gases passing through the furnace and the gas pass are the superheater sections 18, 20, 22 and 24 as well as reheater 26. In the illustrative organization there is provided a vapor and water drum 28 and extending down from this drum is the downcomer 30 which connects with headers at the lower ends of tubes 16. The vapor and water mixture egressing from the upper end of tubes 16 is conveyed to the drum 28 and saturated vapor is taken from this drum through conduit 32 and conveyed to the superheater section 18. From this superheater section the partially superheated vapor is conveyed via conduit 34 to the superheater section 20 and then to the superheater sections 22 and 24, respectively, with sections 20, 22 and 24 forming the secondary or high temperature portion of the superheater. Feedwater is supplied to the generator through conduit 25, connected with the drum 28 and preferably coming from a suitable economizer.

From the final stage 24 of the superheater the superheated vapor is conveyed through conduit 36 to the vapor chest 38 of turbine 40. Extending from and communicating with the vapor chest is the nozzle box of the turbine, identified generally as 42 in FIG. 2 with this nozzle box arrangement in this organization being divided or segmented into quarters so that each chamber or segment communicates with one-quarter of the arcuate extent of the governing stage 43 of the turbine. Each of the sections of the nozzle box communicates with the vapor chest through the openings or passages 44.

It will be appreciated that because of various considerations concerning the vapor generator the pressure in the generator is maintained at least at a suitable value with known controls being utilized for this purpose and which do not form part of generator and accordingly are not illustrated. In a subcritical, circulation generator the pressure may be maintained through regulation of the firing rate while in a once-through generator it may be maintained for example through regulation of the feed of primary fluid and/or the firing rate or a combination thereof.

In accordance with the invention the delivery of superheated vapor to the turbine 40 is controlled by the turbine throttle valve 46 which is interposed in conduit 48 which conveys the vapor from the superheater section 20 to the superheater section 22. The throttle valve 46 is regulated through a suitable control mechanism which responds to the load on the turbine so that the delivery of vapor to the turbine is controlled in such a manner as to meet the turbine demand. In the illustrative organization this control is effected by means of the speed responsive member 50 which controls the valve 46 through the control devices 52 and 54. Since the speed of the turbine is responsive to the load imposed thereon, the member 50 is effectively responsive to the load on the turbine. Thus the delivery of vapor to the turbine is regulated in accordance with and in a manner to meet the load imposed upon the turbine.

Since the superheated vapor throughout the operating load range of the unit is delivered to the full circumferential or arcuate extent of the governing stage, being admitted to each of the compartments of the nozzle box, the turbine is operated at full admission throughout its operating range.

The control valve 46 is positioned in the vapor generating circuit at the location disclosed in order that the throttled vapor may be heated prior to being delivered to the turbine. As the load on the turbine 40 decreases the turbine throttle valve 46 will progressively increase its throttling action which will in turn cause the temperature leaving the throttle valve to be progressively lowered. In passing through the heat exchange sections or the superheater sections 22 and 24 the temperature of this vapor will be raised so that the vapor temperature in the vapor chest 38 and accordingly that delivered to the governing stage of the turbine will be at its desired value. The operation may be such that at full or maximum load of the turbine the vapor 46 may be wide open and as the load is decreased this valve may be progressively closed to increase its throttling action.

In some units, without some control action the temperature of the vapor egressing from the final superheater section 24 will not necessarily be at its desired value throughout the entire operating load range and accordingly in order to insure that this temperature is maintained at its desired value there is provided a temperature control means 56 connected in the conduit 58 which conveys the superheated vapor from the superheater section 22 to the superheater section 24. This temperature control means 56 may be in the form of a direct contact or indirect desuperheater receiving as its cooling fluid the feed supplied through the conduit 25 or suitably pure liquid or vapor from some other source. The delivery of the cooling fluid through conduit 60 is controlled by means of valve 62 which is regulated through the control device 64 in response to the temperature of the vapor passing through conduit 36 as sensed by the temperature sensitive device 66. In the case of a direct contact desuperheater the cooling fluid may be introduced directly into the superheated vapor passing from the heat exchanger 22 to the heat exchanger 24 while in the case of an indirect desuperheater the cooling fluid may be conveyed through coils over which the superheated vapor is passed or the cooling fluid may be passed over coils through which the superheated vapor is conveyed.

In the operation of the unit it may be such that at full load little or no controlling action by means of the temperature control means 56 is necessary with the design being such that the superheated vapor passing through the line 36 to the turbine is at its desired temperature at this maximum load. However, as the load on the power generating unit decreases and the valve 46 is operated to throttle the vapor (with the throttling produced by this valve increasing as the load is decreased) the temperature control means 56 is utilized and operated in a manner to maintain the vapor temperature delivered to the turbine at its desired value with the decreasing load. The control action that is effected by means of the control means 56 may progressively increase as the load is decreased in order to maintain the vapor temperature at its desired value.

It should be noted that in lieu of providing a control means in the nature of a desuperheater, other control actions may be utilized. In any event the action of and purpose for the control means 56 is to controllably vary the temperature of the vapor so that the temperature of the vapor delivered to the turbine throughout the load range may be maintained at its predetermined desired value. It should be further noted that a control means such as 56 is necessary in some units, in others no such means is required with the temperature of the vapor delivered to the turbine being controlled by regulation of the firing rate of the unit.

Accordingly, with the system and method of operation of the invention the power plant is operated with full admission to the governing stage of the turbine throughout the load range while at the same time the temperature of the vapor delivered to the governing stage is maintained at its predetermined desired value. This provides a substantial increase in efficiency over the operating characteristic that would prevail if the temperature of the vapor were not thus controlled while full admission of the turbine was provided.

FIG. 3 illustrates in the curve identified as 68 the heat rate that prevails at various loads when full admission is provided without the regulation of the temperature of the vapor in accordance with the present invention. The curve identified as 70 is a plot of heat rate against load with the system of the invention while curve 72 is a similar plot with the conventional sequential operation of the turbine throttle valves. From this FIG. 3, it is evident that the heat rate (B.t.u./kw. output) obtained with the invention is not as low as that obtained with the conventional sequential valve control system but it is substantially better than that prevailing with full admission and without the temperature control of the invention.

FIG. 4 also illustrates the improvement in the steam condition that is obtained with the invention. In throttling the steam from point 74 to point 76, this being the throttling that takes place at a particular load, not only does the pressure of the steam decrease but the temperature also decreases. Thus while the enthalpy at point 76 is the same as that at point 74 the steam temperature is substantially lower. The condition of the steam at point 76 would be that which would prevail at the regulating stage of the turbine if the steam was not heated to its desired temperature in accordance with the invention. By heating after throttling, this temperature is raised to the point 78 bringing it back to its desired temperature.

For safety purposes there may be provided in conduit 36, preferably at the turbine 40, an overspeed regulating valve 41 controlled in response to the speed of the turbine and operated to prevent the turbine from dangerously overspeeding. This valve would act only as a safety device with normal regulation of delivery of vapor to the turbine being by valve 46. Additionally, there may be provided in conduit 36 a trimming action valve 43 controlled to provide a compensation for the time lag caused by having the control valve 46 located upstream of the superheater sections 22 and 24. The compensating valve would act, in response to load, to cause a rapid correction of the supply to the turbine in the desired sense, and until the control action of the main control valve 46 is felt at the turbine. The action of this compensating valve 43 will be transitory in nature with the main and over-all control of vapor supply to the turbine being effected by valve 46.

It will be understood that each of the heat exchangers 18 through 26 are comprised of tube banks or panels of tubes formed into a bundle and over which the combustion gas stream passes. While the low pressure turbine stage has not been illustrated it will be understood that the reheater 26 receives steam from the exhaust of the high pressure turbine, reheats the steam to its desired temperature with this reheated steam being conveyed to the low pressure turbine portion.

While we have illustrated and described a preferred embodiment of our invention it is to be understood that such is merely illustrative and not restrictive and that variations and modifications may be made therein without departing from the spirit and scope of the invention. We therefore do not wish to be limited to the precise details set forth but desire to avail ourselves of such changes as fall within the purview of our invention.

What we claim is:

1. In a power plant system having a vapor turbine and a vapor generator which supplies said turbine with superheated vapor, the improved method comprising providing full admission to the governing or high pressure turbine stage throughout a substantial load range, regulating the vapor supply to the high pressure turbine stage by throttling the vapor stream at a predetermined location, imparting heat to said vapor downstream of said predetermined location and regulating the heat thus imparted to maintain the temperature of the vapor delivered to the high pressure turbine stage at a predetermined value.

2. The method of operating and regulating a vapor turbine having a nozzle box which supplies high pressure vapor to the high pressure vapor stage at locations generally uniformly distributed throughout the circumferential extent thereof comprising forming a stream of a working fluid and imparting heat thereto to vaporize the same, thereafter imparting additional heat to said stream to superheat this vapor, regulating the delivery of superheated vapor to the turbine in response to the load on the turbine by throttling said stream in the superheating region thereof and prior to the terminal end of said superheating region so that heat is imparted to said stream downstream of the throttling action thereby compensating at least in part for the temperature degradation resulting from the throttling.

3. The method of claim 2 including the step of regulating the temperature of the vapor downstream of the throttling so as to maintain the vapor temperature delivered to the turbine at a generally desired value.

4. The method of claim 2 including sensing the temperature of the vapor delivered to the turbine, providing a regulating action acting on the vapor stream at a location downstream of the throttling location effective to vary the temperature of the vapor at this downstream location and controlling said regulating action in response to said temperature in a manner to maintain the temperature at its generally desired value.

5. The method of claim 2 including regulating the temperature of the vapor at a location downstream of the throttling action and by introducing into the vapor stream an additional stream of fluid.

6. The method of claim 2 wherein the stream downstream of the throttling zone is passed in indirect heat exchange relation with a control fluid and with the heat exchange between said stream and control fluid being regulated.

7. The method of claim 6 wherein said regulation is controlled in response to the temperature of the vapor delivered to the turbine and in a manner to maintain this temperature generally at a predetermined value.

8. In a steam power plant including a turbine and a steam generator which is effective to produce superheated steam that is delivered to the turbine as the operating medium therefor, the method comprising providing full admission of superheated steam to the high pressure turbine generally throughout the load range, regulating the flow of steam to the turbine by throttling said steam flow at a location in the circuit of the steam generator prior to the outlet thereof, imparting sufficient heat to the steam downstream of the throttling zone and at maximum throttling to give a steam temperature at the turbine of a desired value and regulating said temperature to maintain it generally at this desired value for all throttling settings less than said maximum.

9. The method of claim 8 wherein the regulation of temperature is effected by controllably introducing a temperature control fluid directly into said stream.

10. The method of claim 8 wherein said regulation is effected by passing a control fluid in indirect heat exchange relation with this stream and regulating the heat exchange between said stream and said control fluid.

11. A vapor power plant system comprising in combination a vapor generator including a superheater portion, a turbine receiving superheated steam from said portion as its driving medium, said turbine having full admission to its first stage throughout generally its entire operating range, a turbine throttle valve operative to control delivery of vapor to the turbine, said valve being positioned intermediate the extremities of the superheater whereby an appreciable portion of the superheater is effective to heat the vapor to its desired temperature after traversal of the throttle valve.

12. The organization of claim 11 including means operative to control the temperature of the vapor delivered to the turbine.

13. The organization of claim 12 wherein the control means includes a desuperheater.

14. The organization of claim 13 wherein the desuperheater is downstream of the throttle valve.

15. The organization of claim 11 including means effectively responsive to the load on the turbine operative to regulate the throttle valve so as to supply vapor to the turbine to meet said load.

16. In a power plant system the combination of a steam turbine having a nozzle box; means admitting steam to the regulating stage of the turbine throughout the full circular extent of the nozzle box throughout at least a major portion of the load range, a steam generator operative to generate superheated steam and supply the same to the turbine, means for controlling the supply of steam to the turbine including a throttle valve throttling superheated steam, and heat exchange means forming part of said steam generator effective to heat the steam after throttling and prior to admission to the nozzle box.

17. The combination of claim 16 including means operative to regulate the controlling means in accordance with the load on the turbine.

18. The vapor plant of claim 11 including a valve intermediate the turbine and the superheater for rapid temporary control action, and means effectively responsive to the load on the turbine operative to regulate both of the valves so as to supply vapor to the turbine to meet said load.

19. In a steam power plant wherein a steam generator that has a superheater supplies superheated steam to a turbine the improved method comprising operating the turbine throughout a predetermined load range at full admission, controlling the delivery of steam to the turbine principally by regulatingly throttling the same at a location well upstream of the superheater outlet and effectively in accordance with the load on the turbine and providing a temporary control action for rapid correction of turbine input by controllably throttling the steam delivery to the turbine downstream of the superheater outlet.

References Cited in the file of this patent
UNITED STATES PATENTS

| | | |
|---|---|---|
| 2,921,441 | Buri | Jan. 19, 1960 |
| 3,030,779 | Hryniszak et al. | Apr. 24, 1962 |